F. A. CLOSE.
METHOD OF BORING AXIALLY CURVED HOLES.
APPLICATION FILED SEPT. 13, 1915.
1,185,180.
Patented May 30, 1916.
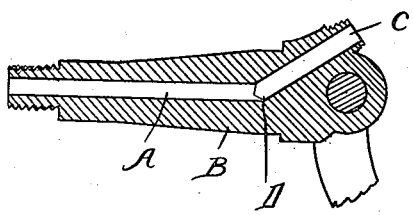
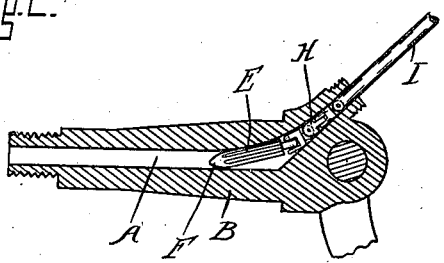
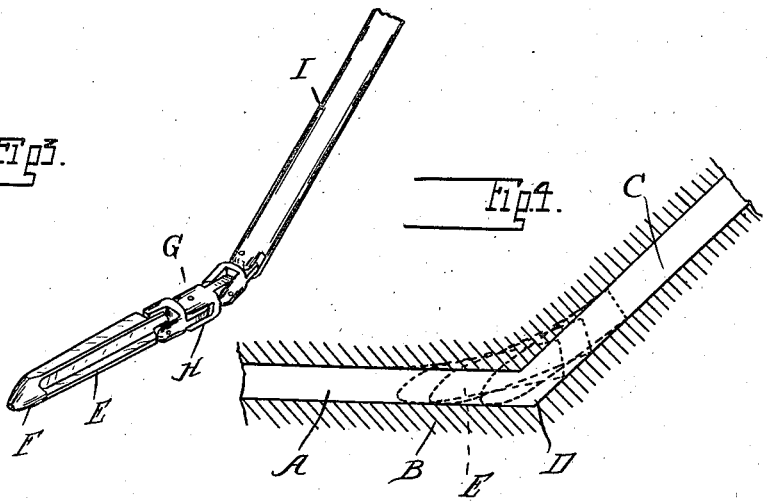
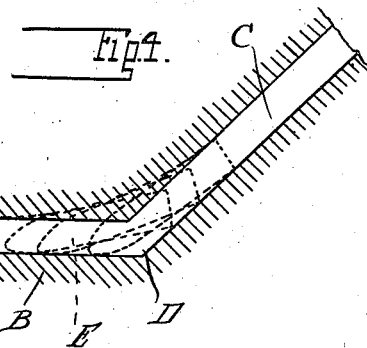
Fred A. Close, Inventor
By Whittemore Hulbert & Whittemore
Attorneys

UNITED STATES PATENT OFFICE.

FRED A. CLOSE, OF UNIONTOWN, PENNSYLVANIA, ASSIGNOR OF ONE-HALF TO GEORGE W. DUNHAM, OF DETROIT, MICHIGAN.

METHOD OF BORING AXIALLY-CURVED HOLES.

1,185,180. Specification of Letters Patent. Patented May 30, 1916.

Application filed September 13, 1915. Serial No. 50,331.

*To all whom it may concern:*

Be it known that I, FRED A. CLOSE, a citizen of the United States of America, residing at Uniontown, in the county of Fayette and State of Pennsylvania, have invented certain new and useful Improvements in Methods of Boring Axially-Curved Holes, of which the following is a specification, reference being had therein to the accompanying drawings.

It is the object of the invention to form curved bores in mechanical structures, and specifically to provide a channel for the reception of a flexible shaft.

To this end the invention comprises the novel method of forming the bore, as hereinafter set forth.

In the drawings I have specifically shown a method of forming curved channels in wheel axle spindles, designed for a flexible shaft connection to a speedometer.

Figure 1 is a longitudinal section through an axle spindle illustrating the first operation; Fig. 2 is a similar view showing the manner of forming the curved section of the bore; Fig. 3 is a perspective view of the reaming tool; and Fig. 4 is a diagrammatic view illustrating the operation.

In the present state of the art it is usual to drive cyclometers and speedometers upon motor vehicles from one of the front wheels, and as this wheel is mounted upon a pivotal spindle a flexible drive connection is essential. One method of forming this flexible drive is by the use of a flexible shafting which passes through a channel in the axle spindle. This necessitates the bore through the spindle, which at the outer end of the latter is in axial alinement therewith, while the inner end is deflected laterally to one side of the pivot. To be operative a flexible shaft when bent must assume a curved form, and therefore the channel for receiving the shaft must be correspondingly curved. The usual boring tools are capable of forming straight holes only, and where a channel is formed by intersecting bores there will be a sharp angle not suitable for a flexible shaft.

To form the curved bore I proceed as follows: I first bore an axial channel A, which extends from the outer end of the spindle B part way through the same. I also form an angling bore C which enters the spindle at one side thereof and extends to a point of intersection with the bore A, forming an abrupt angle D. To remove this angle I next insert a revolving reamer E, the length of which varies according to the radius of the curve to be produced. The nose of this reamer F is tapered or pointed, and therefore when the reamer is forced through one of the bores, such as C, into the other bore A, this nose contacting with the sides of the latter bore will be deflected laterally. This deflection continues as the reamer is forced inward until sufficient material is cut away to admit of the turning of the reamer around the bend and into the axial hole A. The result is a laterally enlarged bore on the inner side of the bend, which is of curved form longitudinally and is therefore suitable for the reception of a flexible shaft.

The tool employed for reaming the curve is illustrated in Fig. 3, and comprises in addition to the reamer E a flexible shaft drive connection G. This preferably comprises a series of short links H transversely pivoted to each other and at the outer end of a series connected with the drive shaft I. The tool constructed as described permits the reamer perfect freedom of movement longitudinally while imparting a constant driving torque thereto.

What I claim as my invention is:—

1. The method of forming curved bores, comprising the formation of intersecting angular bores and the forcing of a short length revolving reamer through said bores to cut away the sharp angle of intersection.

2. The method of forming curved bores, comprising first forming obliquely intersecting angular bores and then forcing a short length revolving reamer through one bore into the other and deflecting it laterally by the oblique wall of the latter bore to cut away the sharp angle.

3. The method of forming curved bores, comprising first forming intersecting angular bores, and forcing a tapering nose revolving reamer from one bore into the other to cut away the sharp angle.

4. The method of forming curved bores, comprising first boring in opposite directions to form obliquely intersecting straight channels, and then forcing a tapering nose revolving reamer from one channel to the other to cut away the inner angle thereof.

In testimony whereof I affix my signature in presence of two witnesses.

FRED A. CLOSE.

Witnesses:
WILBERT R. ABEL,
CARL E. GREGORY.